June 24, 1930. W. H. SAUVAGE 1,767,403
REGULATOR FOR BRAKE RIGGING
Original Filed Nov. 1, 1927
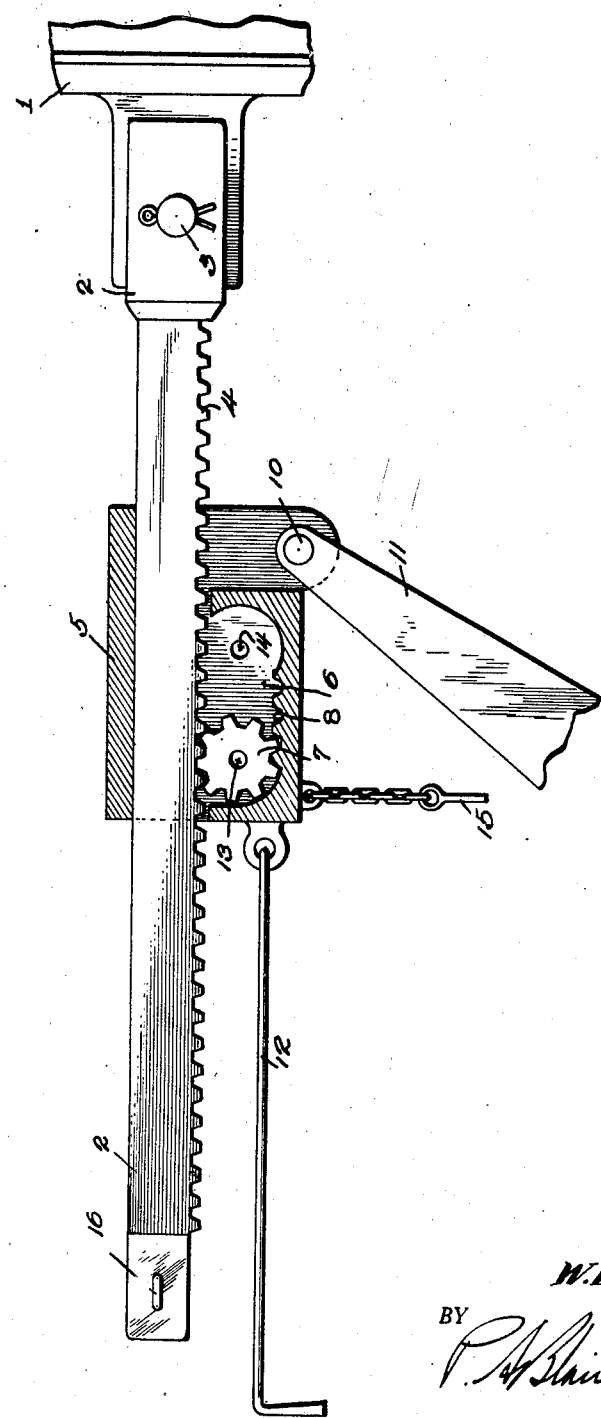
INVENTOR.
W. H. Sauvage
BY
ATTORNEYS Patented June 24, 1930

1,767,403

UNITED STATES PATENT OFFICE

WILLIAM HENRY SAUVAGE, OF NEW YORK, N. Y., ASSIGNOR, BY MESNE ASSIGNMENTS, TO ROYAL RAILWAY IMPROVEMENTS CORPORATION, OF NEW YORK, N. Y., A CORPORATION OF DELAWARE

REGULATOR FOR BRAKE RIGGING

Original application filed November 1, 1927, Serial No. 230,350. Divided and this application filed October 30, 1928. Serial No. 315,965.

This invention is a divisional from my United States Patent No. 1,681,058, dated August 14, 1928, filed November 1, 1927, and relates to regulators for the brake rigging of railway vehicles. It may be used in conjunction with any one of the several levers of the brake gear having a relatively fixed point of support, whereby that point of support may be manually adjusted when desired to re-establish the entire brake rigging into proper relative position to insure predetermined piston travel and proper brake shoe clearance.

One of the objects of the present invention is to provide a simple and practical mechanism of the above general character which will be substantially fool-proof in operation as well as strong and durable in construction.

A further object is to provide a regulator of the above character having few parts which may be inexpensively manufactured and assembled and which may be applied to brake rigging now in general use without material alteration or substitution of parts.

A further object is to provide a mechanism of the above general character which is well adapted to withstand the shocks to which it is subjected in emergency application, and which is not likely to get out of order due to accumulation of dust and dirt.

Other objects will be in part obvious from the annexed drawings and in part hereinafter indicated in connection therewith by the following analysis of this invention.

This ivention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, in which is shown, partly in section, one embodiment of the invention with such of the associated gear as is necessary to understand the same.

As is well known to those familiar with the art, it is desirable to have uniform piston travel of the foundation brake gear and proper brake shoe clearance at the trucks. The present invention will be hereinafter described primarily with its relation to the truck brake rigging, altho as stated in my above mentioned patent, the invention is applicable to any part of the brake rigging where the normally fixed point of support of one of the levers is desired to be changed.

Referring now to the drawing in detail, the numeral 1 indicates a normally fixed point of support associated with the car, such for example as the truck bolster, and to which is secured an elongated member 2 by means of pin 3. This member 2, as herein shown, comprises a bar having a series of teeth 4 along its under side. Slidably mounted upon this bar is a housing 5 having a chamber 6 containing a freely movable holding device, such as pinion 7, meshing with the teeth 4. The lower part of the chamber 6 is also provided with teeth 8 meshing with the teeth of pinion 7.

At one side of the housing is an attaching member such as pin 10 for securing the upper end of a lever 11. In the present invention, this lever may be considered what is usually termed the dead lever of the truck brake rigging. When the brakes are applied, the tendency of the point 10 is to move towards the right, but by reason of the interlocking relation of the holding device or pinion 7 with the racks 4 and 8, such movement is positively prevented. Connected with the left side of the housing 5 is an operating member such as the rod 12 extending towards the end of the car, whereby the brakes may be conveniently regulated from the end of the car without necessitating or requiring the operator to work under the car.

It will be noted that the pinion or holding device 7 is provided with a central hole 13, and the housing 5 is provided with a hole 14 and its side wall. Thus, when the hole 13 registers with the hole 14 during operation, as will be hereinafter described more in detail, a pin 15 may be passed thru these registering holes thereby to hold the pinion at the right end of the chamber 6 where it is free to idly rotate, thereby permitting the housing 5 to be returned to full release position at the right end of the member 2 when it is desired to replace worn brake shoes. It will also be noted that there is preferably provided a stop device at the free end of the rod 2, such for example as a transversely disposed cotter pin 16.

The operation of the device is substantially as follows. When the brakes are operated, the upper end of the lever 11 reacts towards the right, but by reason of the holding device such movement is positively prevented when the brakes are applied. When it is found that the brake shoe clearance or piston travel is abnormal, the operator merely pulls on the handle 12 towards the left and the pinion 7 rolls along the toothed member 4 as well as the lower rack 8 until it reaches the right end of the chamber 6. The distance, for example, between the holes 13 and 14 is proportional to total brake shoe clearance, and if any excess travel exists in the rigging, then the pinion turns idly in the smooth space at the right of the chamber as the housing 5 continues its further regulating movement towards the left.

When the brake shoes carried by the lever 11, for example, are brought into engagement with the peripheries of the wheels, one one each side, further movement is arrested, and the operator releases the pull upon the handle 12 whereby the lever 11 drops back by gravity to carry the housing towards the right to the newly adjusted position as shown. This return movement insures proper brake shoe clearance by reason of the lost motion means above described.

When it is necessary to replace worn brake shoes, the operator repeats the operation above stated, only inserts the pin 15 thru the registering holes 13 and 14 whereupon the housing 5 may be restored to its full release position at the right end of the rod 2. The new brake shoes are then applied and the regulating operation repeated, whereupon the desired brake shoe clearance and piston travel is substantially instantaneously obtained. The housing 5 is preferably made in one part for convenience of assembly, but may be suitably cut away at any desired point in order that the pinion 7 may be inserted into the casing.

From the above it will be seen that the present invention provides a reliable and efficient mechanism of simple and practical construction and well adapted to accomplish among others all of the advantages and objects herein set forth.

Without further analysis the foregoing will so fully reveal the gist of this invention that others can by applying current knowledge readily adapt it for various applications without omitting certain features that, from the standpoint of the prior art, fairly constitutes essential characteristics of the generic or specific aspects of this invention, and therefore such adaptations should and are intended to be comprehended within the meaning and range of equivalency of the following claims.

I claim:

1. In combination with a brake rigging lever having a normally fixed point of support, manually actuated means for changing said fixed point of support including a relatively fixed toothed rod, a housing supported on said rod, holding means associated with said housing and coacting with said toothed rod whereby to permit a free relative movement of the housing substantially proportional to brake shoe clearance and a further movement thereby permanently to take up and hold any excess travel if and when the same occurs, and means for moving said housing.

2. In combination with a brake rigging lever having a normally fixed point of support, manually actuated means for changing said fixed point of support including a relatively fixed rod having teeth on one side, a member supported on said rod and connected with said lever adapted to have a free movement substantially proportional to normal brake shoe clearance, a holding device associated with said housing and coacting with said toothed rod, and manually actuated means for moving said housing thereby to permit said holding means to take up one or more teeth on said rod if and when excess travel occurs.

3. In combination with a brake rigging lever having a normally fixed point of support, manually actuated means for changing said fixed point of support including a relatively fixed rod having teeth on one side, a member supported on said rod and connected with said lever adapted to have a free movement substantially proportional to normal brake shoe clearance, a holding device associated with said housing and coacting with said toothed rod, manually actuated means for moving said housing thereby to permit said holding means to take up one or more teeth on said rod if and when excess travel occurs, and means for holding said holding device out of effective cooperative relation with said toothed rod when it is desired to return the parts to full release position.

4. In combination with a brake rigging lever having a normally fixed point of support, manually actuated means for changing said fixed point of support including a relatively fixed rod having teeth on one side, a housing supported on said rod and movable relatively therealong, holding means coacting with the teeth on said rod and housing adapted to prevent movement of the fixed point of support of said lever when the brakes are applied, manually actuated means for moving the housing and changing the relative position of the holding means with respect to the toothed rod if and when excess travel exists over and above a predetermined lost motion substantially proportional to brake shoe clearance.

5. A manually operated regulator for brake rigging of railway vehicles including a fixed take up rod having teeth on one side, an elongated member adapted to be pivotally connected with a brake lever and positioned substantially parallel with said rod, and holding means associated with said member coacting with the teeth on said rod, said means adapted to have a relative free lost motion with respect to said member substantially proportional to brake shoe clearance then to take up the excess travel if and when the same exists, said holding means adapted to cooperate with said teeth to prevent a retractive movement of the lever beyond the lost motion distance.

6. A manually operated regulator for brake rigging of railway vehicles including a fixed take up rod having teeth on one side, a housing movable along said rod, means in said housing adapted to coact with the teeth of said rod to permanently take up and hold excess travel, a brake lever connected with said housing and a manually actuated member connected with said brake lever adapted to move said lever and housing a distance substantially proportional to brake shoe clearance as well as any excess distance if and when the same exists, said housing and holding means cooperating to permit a lost motion movement substantially proportional to brake shoe clearance.

Signed at New York, New York, this 29th day of October, 1928.

WILLIAM HENRY SAUVAGE.